United States Patent
Aizawa

(10) Patent No.: US 9,798,001 B2
(45) Date of Patent: Oct. 24, 2017

(54) RADAR APPARATUS AND ANGLE VERIFICATION METHOD

(75) Inventor: Ichiro Aizawa, Toyota (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 133 days.

(21) Appl. No.: 14/402,528

(22) PCT Filed: May 21, 2012

(86) PCT No.: PCT/JP2012/062966
§ 371 (c)(1),
(2), (4) Date: Nov. 20, 2014

(87) PCT Pub. No.: WO2013/175558
PCT Pub. Date: Nov. 28, 2013

(65) Prior Publication Data
US 2015/0130655 A1    May 14, 2015

(51) Int. Cl.
*G01S 13/42* (2006.01)
*G01S 3/74* (2006.01)
*G01S 13/93* (2006.01)
*G01S 7/35* (2006.01)

(52) U.S. Cl.
CPC ............ *G01S 13/42* (2013.01); *G01S 3/74* (2013.01); *G01S 13/931* (2013.01); *G01S 7/354* (2013.01); *G01S 2013/9346* (2013.01); *G01S 2013/9375* (2013.01)

(58) Field of Classification Search
CPC ...................................................... G01S 13/93
USPC ....................................................... 342/147
See application file for complete search history.

(56) References Cited

U.S. PATENT DOCUMENTS

| 6,157,339 A * | 12/2000 | Sato ............... G01S 13/44 342/107 |
| 8,305,258 B2 | 11/2012 | Yamada et al. |
| 2005/0156780 A1* | 7/2005 | Bonthron ........... G01S 13/343 342/107 |
| 2008/0297402 A1* | 12/2008 | Wooldridge .......... G01S 7/024 342/174 |

FOREIGN PATENT DOCUMENTS

| JP | 2009-133761 | 6/2009 |
| JP | 2011-027695 | 2/2011 |

* cited by examiner

*Primary Examiner* — Peter Bythrow
*Assistant Examiner* — Helena Seraydaryan
(74) *Attorney, Agent, or Firm* — Finnegan, Henderson, Farabow, Garrett & Dunner, LLP

(57) ABSTRACT

A radar apparatus is provided to receive a transmission wave reflected by a target object by antennas. The radar apparatus includes a signal analysis unit to analyze reception waves, and to obtain amplitudes and phases of the reception waves, at a frequency with which reception strength shows a peak. The radar apparatus also includes a direction detection unit to detect a direction of the target object based on the phases of the reception waves, and an estimated amplitude and phase output unit to output estimated amplitudes and estimated phases of reception waves to be received, assuming that the target object exists in the detected direction. The radar apparatus further includes a comparison unit to compare the amplitude or phase obtained by the signal analysis unit with that output by the estimated amplitude and phase output unit.

5 Claims, 13 Drawing Sheets

FIG.7
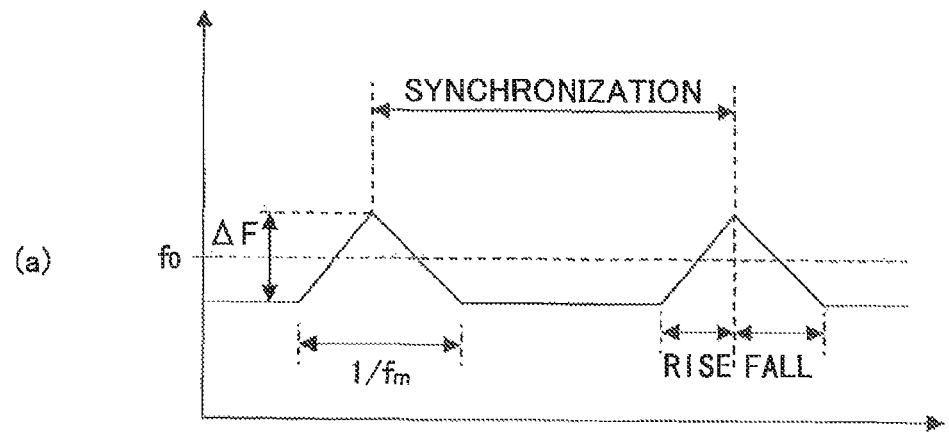
(a)
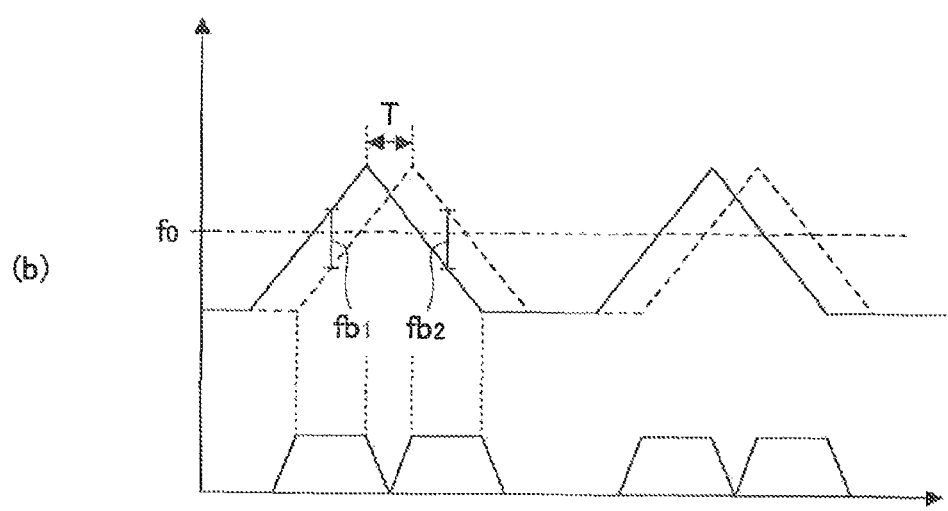
(b)
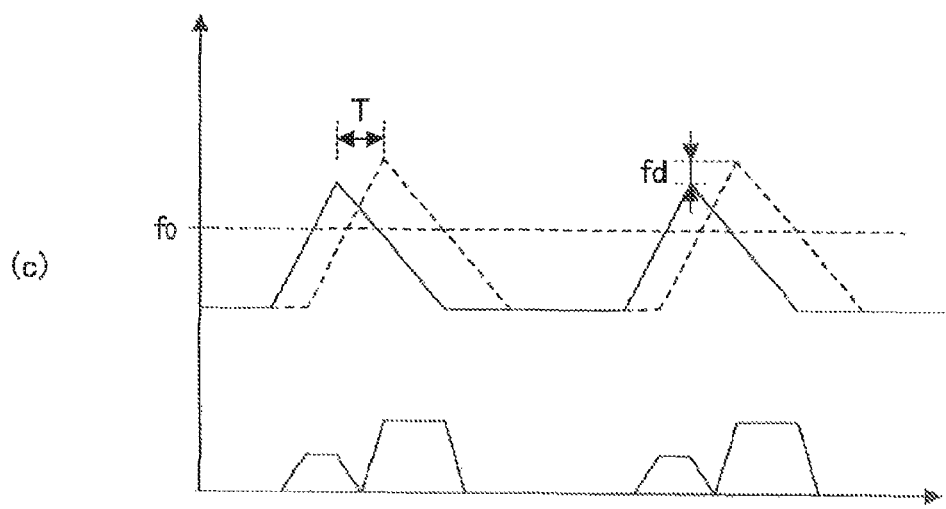
(c)

RADAR APPARATUS AND ANGLE VERIFICATION METHOD

CROSS REFERENCE TO RELATED PATENT APPLICATIONS

This application is a national phase of International Application No. PCT/IJP2012/062966, filed on May 21, 2012, which is incorporated herein in its entirety by reference.

TECHNICAL FIELD

The present invention relates to a radar apparatus that receives a reflected wave reflected by a target object by an antenna to detect the direction of the target object.

BACKGROUND ART

There are cases where a vehicle uses information about a target object detected by an in-vehicle radar apparatus, to perform drive support by having various in-vehicle devices cooperate for avoiding an obstacle, and to control the vehicle speed and the distance to a preceding vehicle to travel while following the preceding vehicle. The radar apparatus irradiates, for example, a millimeter wave to a predetermined range in front of the vehicle, and receives a reflected wave reflected by a target in the irradiation range. Then, by analyzing the reception wave, the distance, relative speed, and direction (angle or lateral position) to the target are detected.

However, a radio wave such as a millimeter wave is reflected by an object other than the preceding vehicle or the detection target, such as a wall, a road surface, and a manhole, and hence, the reflected wave is received via a what-is-called "multipath". This makes the detection difficult, especially for the direction of the target. For example, when the vehicle is traveling through a tunnel, the radio wave is reflected by a sidewall of the tunnel, which makes the vehicle detect a target on the sidewall side in front. Such a target detected by a reception wave received after being reflected by a wall is called a "mirror ghost".

Since a mirror ghost does not need to be detected as a target, technologies have been considered to distinguish a mirror ghost from a preceding vehicle (see, for example, Patent Document 1). Patent Document 1 discloses a radar apparatus that sets a virtual wall beside a detected target to detect a mirror ghost based on the speed of another target symmetrically positioned with the target with respect to the virtual wall.

However, there are cases where the radar apparatus described in Patent Document 1 cannot detect a mirror ghost and a preceding vehicle separated from each other.

FIG. 1 is an example of diagrams illustrating a problem with a conventional radar apparatus. In FIG. 1(a), the radar apparatus of a vehicle separately detects a preceding vehicle and another target (mirror ghost) symmetrically positioned with respect to a virtual wall. Therefore, it is possible to detect that a reception wave reflected by the wall is not from the target, but from the mirror ghost. On the other hand, in FIG. 1(b), the radar apparatus of the vehicle detects a target about an intermediate point between the preceding vehicle and the mirror ghost. Such inconvenience tends to occur when the space between the preceding vehicle and the wall is narrow; the distance between the vehicle and the preceding vehicle is great; or, an angle formed between the direction of the mirror ghost and the direction of the preceding vehicle is small when viewed from the vehicle.

In such cases, the radar apparatus detects that a target is positioned in an intermediate direction (on the virtual wall) between the preceding vehicle and the mirror ghost. Consequently, the target itself is detected, but its direction is shifted.

Thus, the conventional radar apparatus has the problem in that it cannot distinguish a preceding vehicle from a mirror ghost, depending on a relative positional relationship among the preceding vehicle, the virtual wall, and the vehicle.

[Patent Document 1] Japanese Laid-open Patent Publication No. 2009-133761

SUMMARY OF THE INVENTION

Problem to be Solved by Invention

In view of the above, it is an object of the present invention to provide a radar apparatus that can detect a reception wave coming from a target object possibly including radio waves in multiple directions.

Means to Solve the Problem

According to at least an embodiment of the present invention, a radar apparatus configured to receive a transmission wave reflected by a target object by a plurality of antennas, includes a signal analysis unit configured to analyze reception waves received by the respective antennas, and to obtain an amplitude and a phase of each of the reception waves received at the respective antennas, the amplitude and the phase being obtained at a frequency with which a reception strength shows a peak; a direction detection unit configured to detect a direction of the target object based on the phases of the reception waves received by the respective antennas; an estimated amplitude and phase output unit configured to output an estimated amplitude and an estimated phase of each of reception waves to be received by the respective antennas, assuming that the target object exists in the direction detected by the direction detection unit; and a comparison unit configured to compare at least one of the amplitudes and the phases for each of the antennas such that the amplitude obtained by the signal analysis unit is compared with the amplitude output by the estimated amplitude and phase output unit, and the phase obtained by the signal analysis unit is compared with the phase output by the estimated amplitude and phase output unit.

Advantage of the Invention

According to at least an embodiment of the present invention, it is possible to provide a radar apparatus that can detect a reception wave coming from a target object possibly including radio waves in multiple directions.

BRIEF DESCRIPTION OF DRAWINGS

FIG. 7 is an example of diagrams illustrating a beat frequency;

DESCRIPTION OF REFERENCE SYMBOLS

Figure 1:
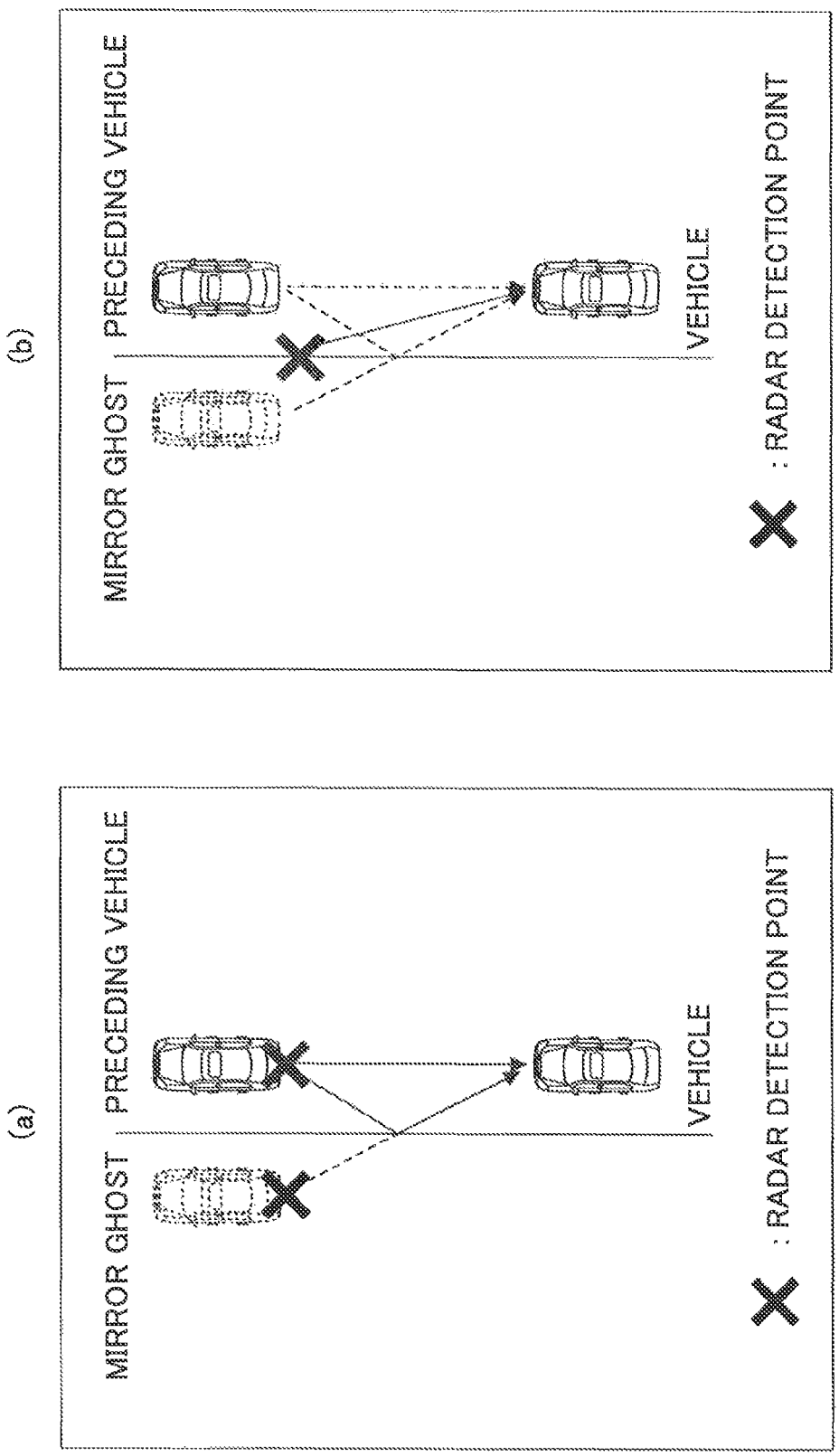
FIG. 1 is an example of diagrams illustrating a problem with a conventional radar apparatus.

11 transmission antenna
12 reception antenna
13 signal oscillator
14 mixer
16 signal analysis unit
21 transmission wave control unit
22 FFT unit
23 angle detection unit
24 angle verification unit
100 radar apparatus
200 collision determination unit

MODE FOR CARRYING OUT THE INVENTION

Figure 2:
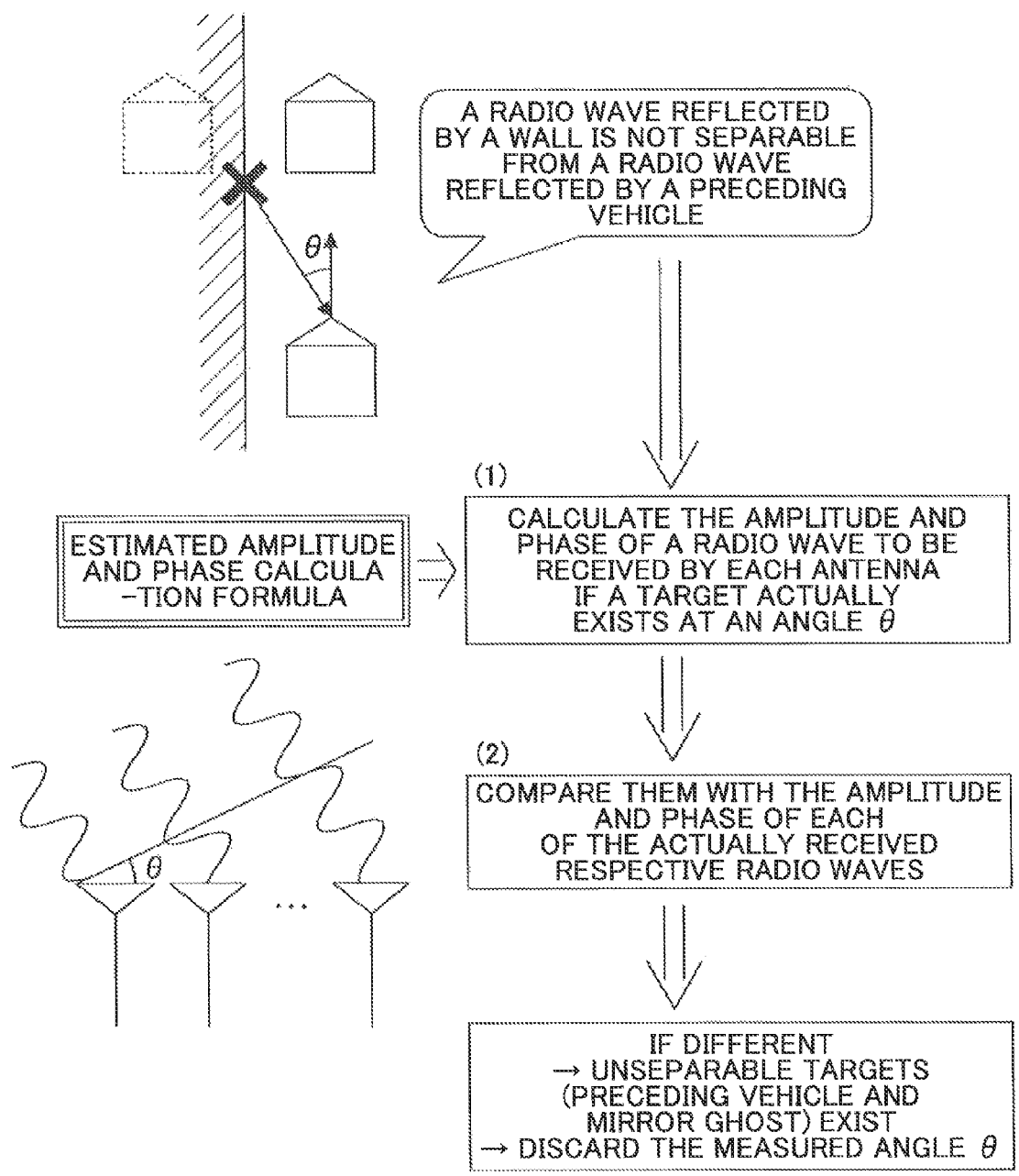
FIG. 2 is an example of diagrams illustrating general features of a radar apparatus according to an embodiment of the present invention.

FIG. 2 is an example of diagrams illustrating general features of a radar apparatus according to an embodiment of the present embodiment. As described above, there are cases where a radar apparatus cannot separate a radio wave reflected by a wall in a tunnel or the like, from a radio wave reflected by a preceding vehicle. Although the preceding vehicle should be detected in the front direction in an example in the figure, a target is detected at an angle θ.

The radar apparatus determines whether a target (a mirror ghost in this case) exists in the direction at the measured angle θ, or the target is not separated due to a multipath as follows.

(1) First, the radar apparatus calculates the amplitude and phase of a radio wave to be received by each antenna when a target actually exists at an angle θ, using an estimated amplitude and phase calculation formula, which will be described later. Although the angle θ is obtained from the amplitudes and phases of the radio waves received by the respective antennas, the amplitudes and phases of the radio waves received by the respective antennas are not the same, depending on whether an unseparable target exists or not. This knowledge is utilized in the present embodiment.

(2) The radar apparatus refers to the amplitudes and phases of the radio waves received by the respective antennas. The amplitude and phase of the radio wave received by each of the antennas is obtained by, for example, Fourier transform of a beat signal. The radar apparatus compares the amplitude and phase of the radio wave received by each of the antennas obtained at (1), with the amplitude and phase of each of the actually received radio waves obtained at (2).

(3) If the amplitude and phase calculated by the estimated amplitude and phase calculation formula are different from the amplitude and phase obtained at (2), it is estimated that the measured angle θ is erroneous, and unseparable targets (preceding vehicle and mirror ghost) may exist. Therefore, the radar apparatus discards the measured angle θ, and stops capturing a target based on unseparable radio waves.

Thus, the radar apparatus in the present embodiment can prevent detection precision of the lateral position of a preceding vehicle from being reduced when a multipath is generated in a tunnel that makes a target unseparable.

Note that although the present embodiment focuses on a multipath from a preceding vehicle and a wall (or a ceiling surface) of a tunnel, it is favorably applicable to a situation where multiple reception waves cannot be separated because the multiple reception waves come in close directions, regardless of an existence of a multipath. Also, it is applicable to any moving objects or fixed objects as long as they can reflect a millimeter wave.

Also, although a reflecting object of a radar is called a "target object" in general, a reflection source of a multipath and a preceding vehicle may not be distinguished, and called a "target" in the present embodiment. Also, although an angle θ at which a target is detected may be called a "direction", an "azimuth", or a "lateral position", it is consistently called an "angle" in the present embodiment.

[Basic Signal Processing of Radar Apparatus]

Figure 3:
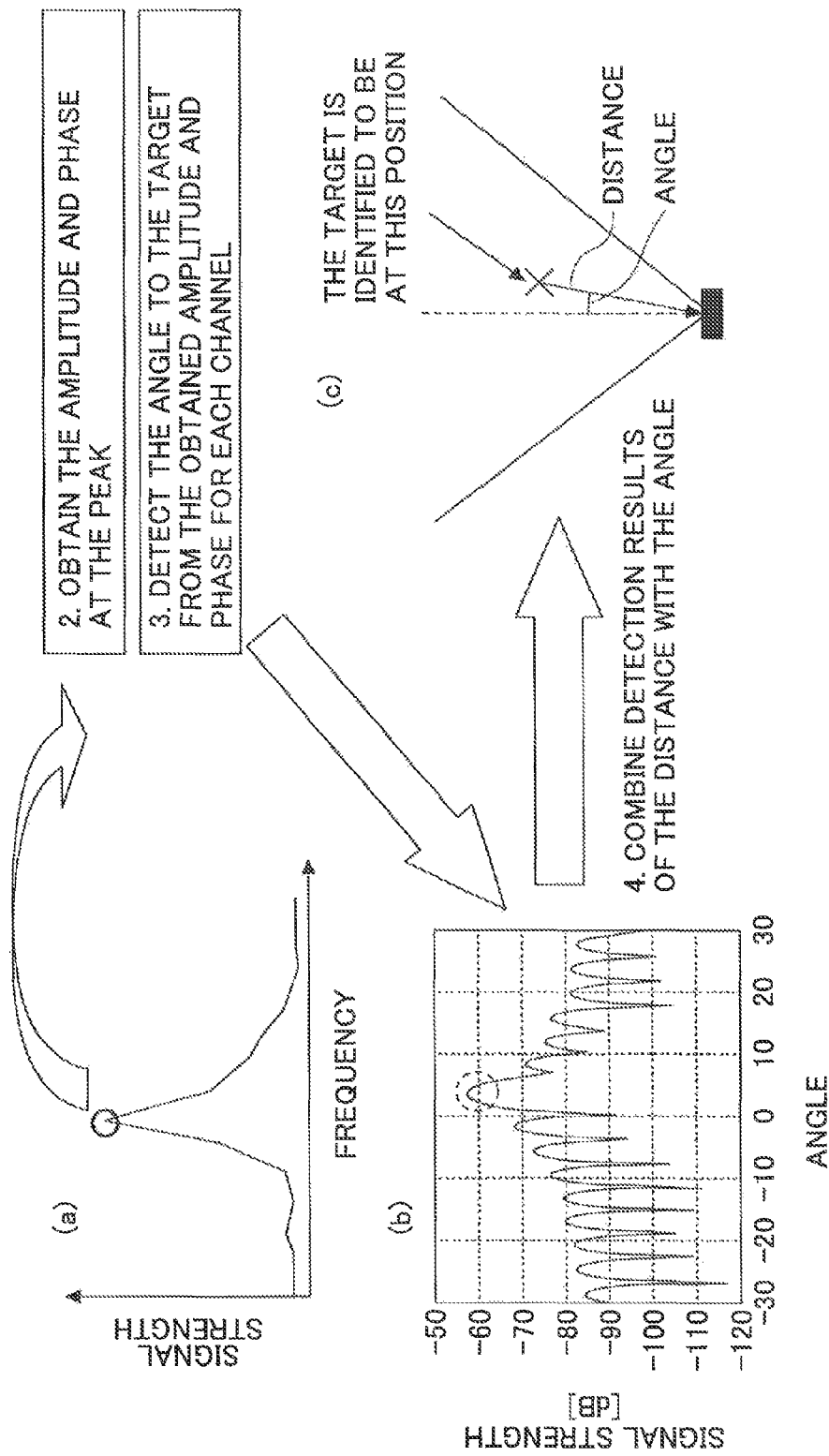
FIG. 3 is an example of diagrams schematically illustrating steps to detect the distance and direction to a target executed by a radar apparatus.

FIG. 3 is an example of diagrams schematically illustrating steps to detect the distance and direction to a target executed by a radar apparatus.

1. Detect the distance to a target for each channel of the reception antenna. The horizontal axis in FIG. 3(a) represents a frequency, and the vertical axis represents a signal strength. As will be described later, the distance and relative speed to a target can be detected from a frequency where the signal strength takes a peak. Note that the resolution of the frequency is limited by calculation precision, and the frequency where the signal strength takes a peak is determined within a certain range (a calculation point that will be described later, also called a "bin").

2. Identify the peak frequency from the signal in FIG. 3(a), and obtain the amplitude and phase at the peak frequency. The peak frequency, amplitude and phase are obtained for each of the channels.

3. Detect the angle to the target from the obtained amplitude and phase for each of the channels. There are several angle detection methods, for example, DBF (Digital Beam Forming) process and MUSIC (Multiple Signal Classification) analysis, which may be used to detect the angle to a target. FIG. 3(b) is an example of a diagram illustrating a detection result of the angle by the DBF process. The signal strength is obtained with respect to the angle. The angle at which the target exists is an angle where the signal strength takes the peak.

4. From the distance and angle, it is possible to identify how far the target is positioned from the vehicle, and at which angle the target is positioned relative to the front. FIG. 3(c) is an example of a diagram illustrating the position of the target. By analyzing the signal strength of multiple channels in this way, the position of a target can be identified. Note that if a target is long in the width direction, the angle to the center in the width direction is identified.

[Detailed Signal Processing Steps]

Figure 4:
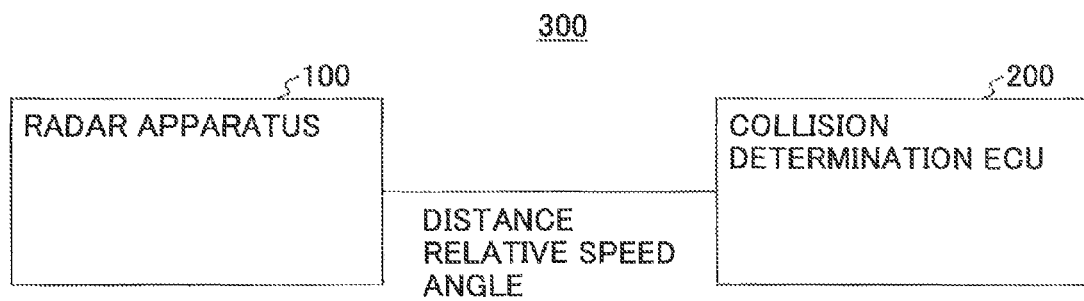
FIG. 4 is an example of a configuration diagram illustrating an in-vehicle system that includes a radar apparatus and a collision determination unit.

FIG. 4 is an example of a configuration diagram illustrating an in-vehicle system 300 that includes a radar apparatus and a collision determination ECU. The radar apparatus 100 and the collision determination ECU (Electronic Control Unit) 200 are connected with each other via an in-vehicle LAN, for example, a CAN (Controller Area Network). The radar apparatus 100 is disposed at a center portion in the front of the vehicle, for example, a front grill of the vehicle, to irradiate a millimeter wave in a predetermined angle centered around the front of the vehicle (for example, left and right 10° centered around the front), and to receive a reflected wave reflected by a target existing in this range. The radar apparatus 100 is, for example, an FMCW (Frequency Modulated Continuous Wave) radar.

The radar apparatus 100 periodically outputs the distance, relative speed, and angle to every target to the collision determination unit 200. The collision determination unit 200 calculates the TTC (Time To Collision) for each of the targets from the distance and relative speed. Then, it identifies a target that has a smallest TTC among targets having angles below a predetermined value that indicates closeness to the vehicle, and if the TTC becomes less than or equal to a threshold, it executes drive supports such as displaying an alarm on a meter panel, blowing an alarm sound, and/or executing automatic braking. Also, another ECU may execute traveling control to follow a preceding vehicle by adjusting the distance to the preceding vehicle depending on the vehicle speed.

Figure 5:
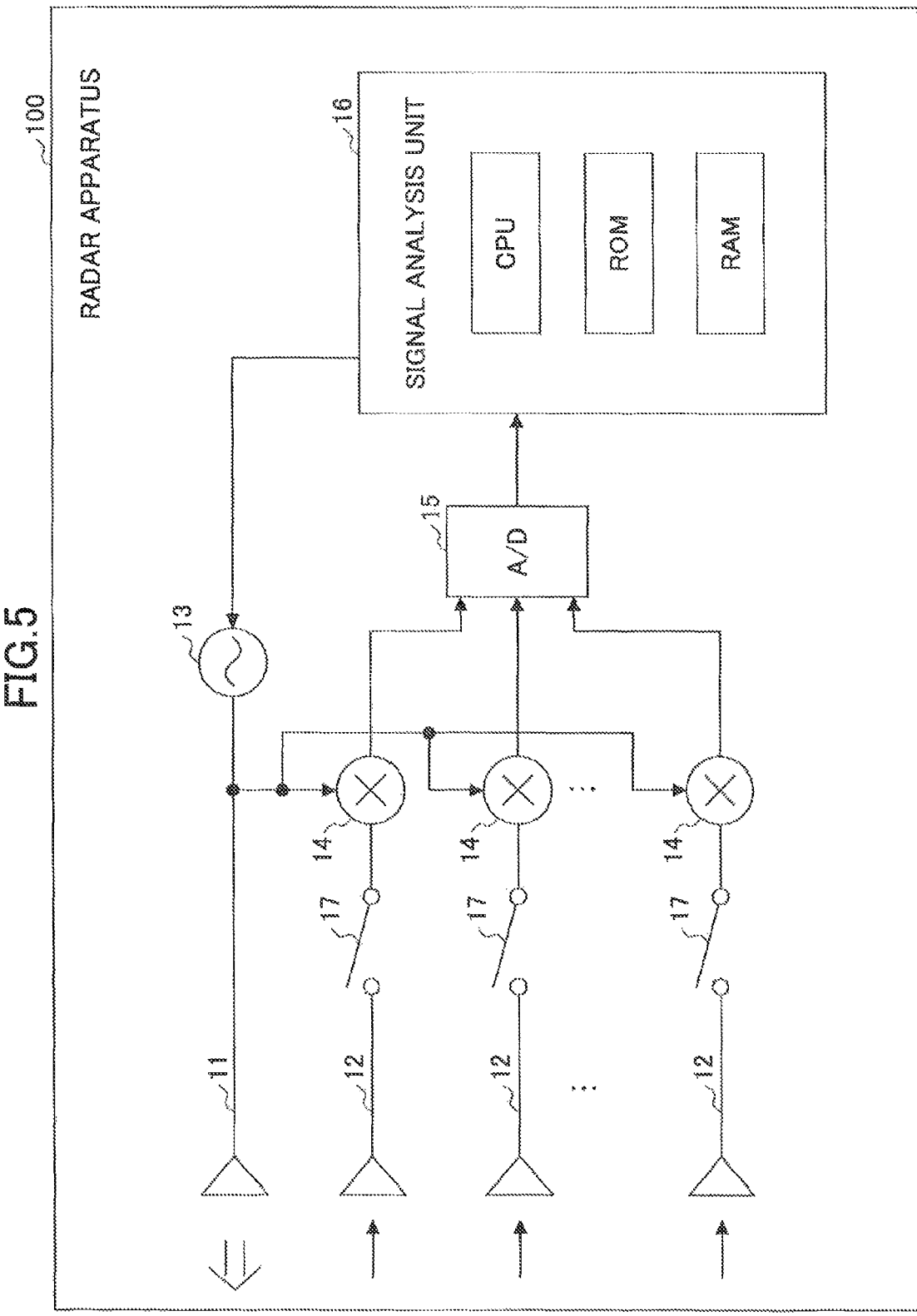
FIG. 5 is an example of a general configuration diagram of a radar apparatus.

FIG. 5 is an example of a general configuration diagram of the radar apparatus 100. The radar apparatus 100 includes a transmission antenna 11, n (n≥2) units of reception antennas 12, switches 17 to connect or disconnect the respective reception antennas 12 and mixers 14, a signal oscillator 13, the mixers 14, an A/D converter 15, and a signal analysis unit 16.

The signal oscillator 13 generates a high-frequency signal in a millimeter wave band. The signal oscillator 13 can change the frequency of the high-frequency signal to be generated by control of the signal analysis unit 16. The transmission antenna 11 transmits a radar wave (transmission wave) corresponding to the high-frequency signal generated by the signal oscillator 13 within a predetermined angle range. The reception antennas 12 receive the radar wave (reflected wave) reflected by a target.

The reception antennas 12 always receive the reflected wave, and the switches 17 selectively connect one of the reception antennas 12 with the corresponding mixer 14. States of the switches 17 are controlled by the signal analysis unit 16. Each of the mixers 14 generates a beat signal by mixing the transmission wave and the reception wave, and outputs it to the A/D converter circuit 15. The A/D converter 15 applies A/D conversion to the beat signal, and outputs it to the signal analysis unit 16.

The signal analysis unit 16 is a microcomputer including a CPU, a ROM, a RAM, and the like, and also includes an I/O, a DSP, a CAN controller, and the like (not illustrated). The signal analysis unit 16 repeats bringing up and down the frequency generated by the signal oscillator 13, analyzes the beat signal, and calculates the distance, relative speed, and angle to the target.

Figure 6:
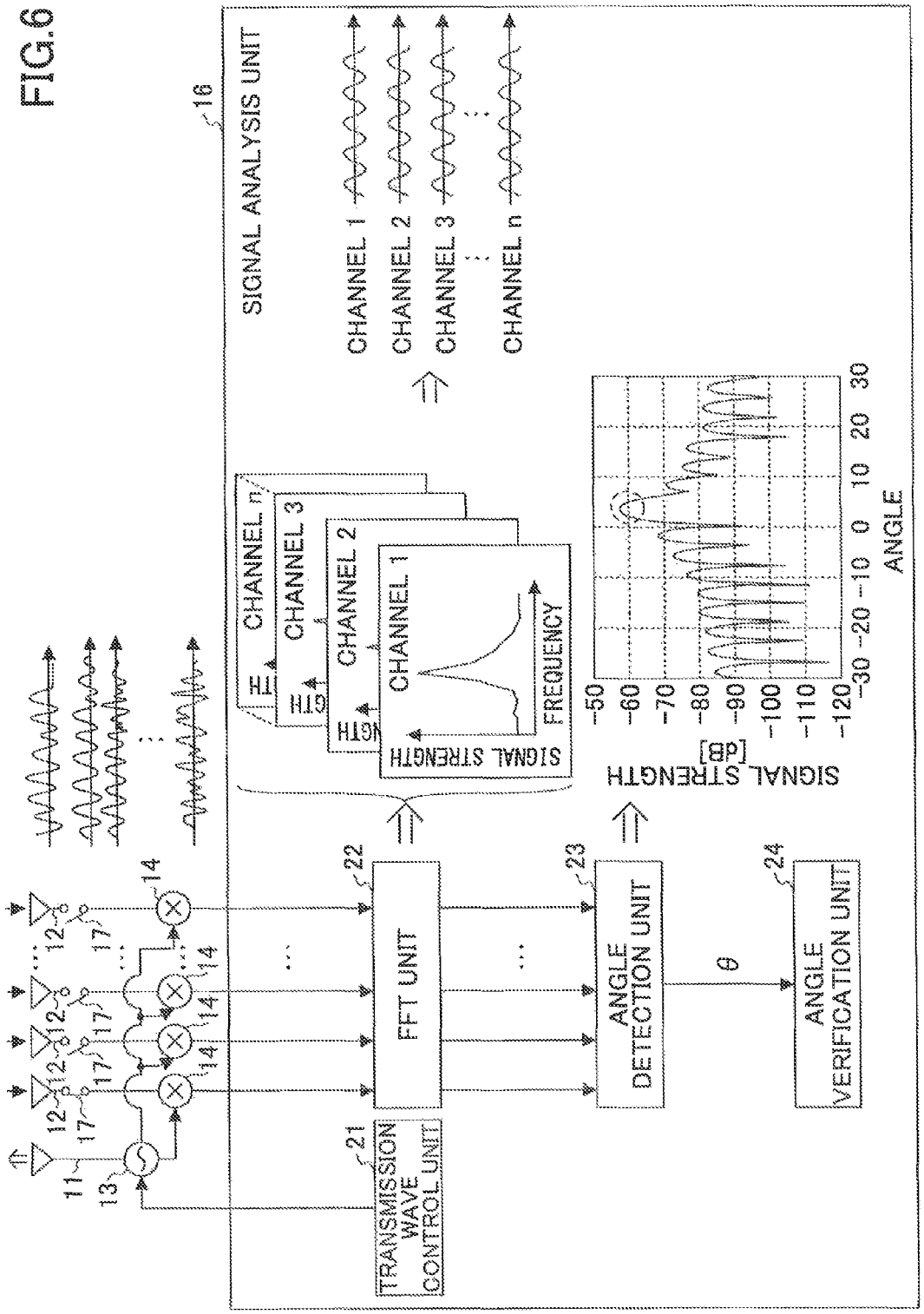
FIG. 6 is an example of a functional block diagram schematically illustrating a signal analysis unit.

FIG. 6 is an example of a functional block diagram schematically illustrating the signal analysis unit 16. The signal analysis unit 16 includes a transmission wave control unit 21, an FFT unit 22, an angle detection unit 23, and an angle verification unit 24.

First, the beat signal will be described. Only one of the switches 17 between the reception antennas 12 and the mixers 14 is turned on at a certain moment. Therefore, a transmission wave transmitted by the transmission antenna 11 and reflected by a target is received by the reception antennas 12 in a time-sharing manner to obtain a beat signal with each of the reception antennas 12. The frequency of a beat signal is called a "beat frequency".

FIG. 7 is an example of diagrams illustrating a beat frequency. The transmission wave control unit 21 controls the frequency of the signal oscillator 13 to make it repeatedly changed to have a linearly rising interval for a predetermined ratio in terms of time (this interval is called a "rise interval"), followed by a linearly falling interval for the predetermined ratio (this interval is called a "fall interval"). The frequency of the transmission wave is increased by ΔF and decreased by ΔF within a duration of 1/fm. The center frequency is $f_0$. The transmission wave control unit 21 controls to repeat the increase and decrease of the frequency for every predetermined cycle (for example, 100 ms). Note that although the frequency is stable for a certain interval in the figure, the frequency may be constantly increased and decreased.

Having been reflected by a target, the transmission wave returns to the vehicle as a reflected wave. The reception antennas 12 of the radar apparatus 100 receive this reflected wave, respectively. Here, $fb_1$ represents the beat frequency of a rise interval, and $fb_2$ represents the beat frequency of a fall interval. Also, fr represents the beat frequency when the relative speed is zero, and fd represents a Doppler frequency (increased or decreased amount) when the relative speed is not zero. The beat frequency $fb_1$ of the rise interval is a value obtained by subtracting the Doppler frequency fd from the beat frequency fr at the relative speed of zero, and the beat frequency $fb_2$ of the fall interval is a value obtained by adding the Doppler frequency fd to the beat frequency fr at the relative speed of zero.

$$fb_1 = fr - fd$$

$$fb_2 = fr + fd$$

Therefore, fr and fd are obtained as follows.

$$fr = (fb_1 + fb_2)/2$$

$$fd = (fb_2 - fb_1)/2$$

Since the millimeter wave makes a round trip to the target at a distance R, time T that passes from transmission of the transmission wave until reception of the reflected wave is represented as follows, where C represents the speed of light.

$$T = 2R/C$$

The rise ratio (slope) of the frequency is 2·ΔF·fm. Therefore, treating an amount of change of the frequency during the time T as the beat frequency fr, fr is represented by $$fr = T \cdot 2 \cdot \Delta F \cdot fm$$
$$= (2R/C) \cdot 2 \cdot \Delta F \cdot fm$$

By detecting $fb_1$ and $fb_2$ from this, the distance R to the target can be obtained.

$$R = (C/(4 \cdot \Delta F \cdot fm)) \cdot fr$$

Also, by using a formula of the Doppler effect, the relative speed V can be obtained.

$$V = (C/(2 \cdot f_0)) \cdot fd$$

The reception waves received by the reception antennas 12 include waves having various frequencies, amplitudes, and phases due to an influence of a multipath and the like. Therefore, the FFT unit 22 applies a Fourier transform to the beat signal to extract only the beat signal from the reception wave received by the reception antennas 12. Thus, $fb_1$ and $fb_2$ can be extracted from the beat signal.

To extract $fb_1$ and $fb_2$, the FFT unit 22 applies the Fourier transform to the beat signal in the rise interval and the fall interval, respectively. By applying the Fourier transform, wave components having multiple frequencies are obtained. In general, a wave is represented by a complex vector. The result of the Fourier transform is represented by F (i indicates an imaginary number) as follows.

$$F = \Sigma(a_n \cdot \cos(nwt) + i \cdot b_n \cdot \sin(nwt))$$

The signal strength takes a peak at frequencies corresponding to $fb_1$ and $fb_2$ because the signal strength is high at frequencies included in the signal. As illustrated in FIG. 6, peaks of the signal strengths are obtained with respect to frequencies of the respective antennas. Although results of the Fourier transform in FIG. 6 show a single peak, multiple peaks may exist if multiple targets exist. Also, peaks are obtained in the rise interval and the fall interval, respectively. The peak frequency detected from the reception wave in the rise interval is $fb_1$, and the peak frequency detected from the reception wave in the fall interval is $fb_2$. Once $fb_1$ and $fb_2$ are obtained, the distance R and the relative speed V to the target can be obtained by the above formula.

Note that the position of the peak may be estimated by calculating change of power P with respect to the frequency, and assuming that a peak exists at a frequency where the power P is changed from increasing to decreasing. Also, to reduce side lobes included in a calculation result of the Fourier transform, a known window process is applied using a window function.

Also, the FFT unit 22 extracts the amplitude and phase of the reception wave at the frequency where the power takes the peak for each of the reception antennas. The amplitude can be treated as the power P, which is obtained as follows. Note that a subscript of "p" means a frequency where the power takes a peak.

$$P(w) = \sqrt{(a_p^2 + b_p^2)}$$

Also, the phase relative to the real axis is obtained by the next formula.

$$\phi_p = \tan^{-1}(a_p/b_p)$$

In this way, information about the amplitudes and phases of the frequency components of $fb_1$ and $fb_2$ is obtained by the Fourier transform. In FIG. 6, the amplitudes and phases of $fb_1$ and $fb_2$ obtained by the result of the Fourier transform are illustrated as waves of the respective reception antennas.

Note that a relationship between frequency and signal strength obtained by the Fourier transform is calculated by for certain frequencies. Therefore, it is actually discrete data although it is represented as continuous data in the figure. The frequency where the signal strength is obtained is called a "calculation point" or a "bin".

Next, the angle detection unit 23 calculates the angle of the target from the amplitudes and phases obtained from the peak frequencies of the beat signals received by the respective reception antennas 12. When the target is positioned at an angle relative to the front direction of the vehicle, a phase difference is generated between the reception antennas 12 depending on the angle.

Figure 8:
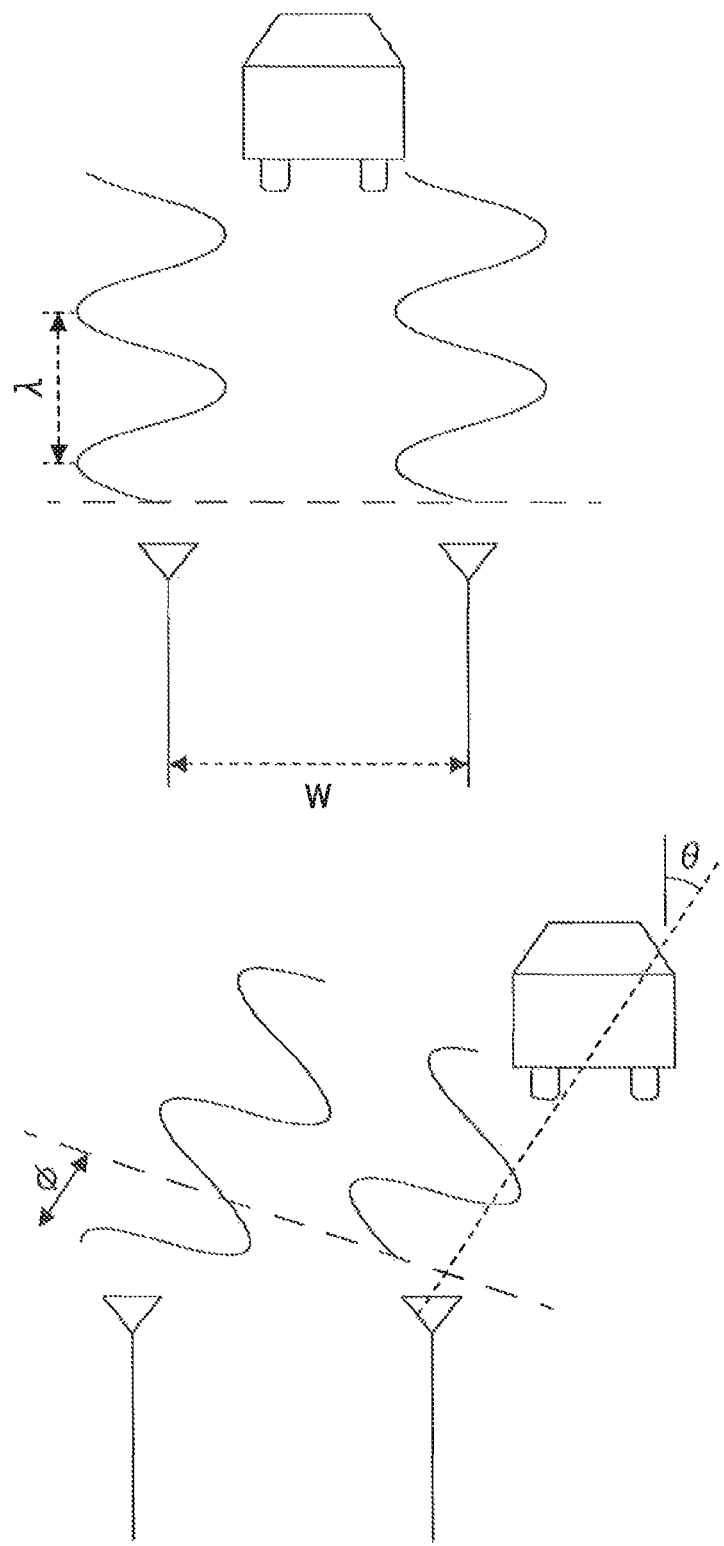
FIG. 8 is an example of diagrams illustrating a phase difference when a target is in front, and a phase difference when a target is positioned at a certain angle.

FIG. 8(a) is an example of a diagram illustrating a phase difference between reception waves received by adjacent reception antennas 12 when a target is in front, and FIG. 8(b) is an example of a diagram illustrating a phase difference between reception waves received by the adjacent reception antennas 12 when the target is positioned at an angle. When the target is in front, virtually no path difference is generated between the target and the reception antennas 12, and no phase difference is generated between the reception antennas 12. On the other hand, when the target is not in front, a path difference is generated between the target and the reception antennas 12, and a phase differences $\phi$ is generated between the reception antennas 12.

Although a relationship between the angle $\theta$ at which a target exists, and the phase difference $\phi$ may be changed depending on a placement interval of the reception antennas 12 and the wavelength of a radio wave, the angle $\theta$ can be calculated once the phases are obtained because the placement interval of the radio wave reception antennas 12 and the wavelength are fixed. The angle $\theta$ can be obtained from the formula below.

$$\theta = \arcsin(\text{phase of reception antenna}_i - \text{phase of reception antenna}_{i+1}) \cdot \lambda/(2n \cdot W)$$

where $\lambda$ represents the wavelength of a radio wave, and W represents the placement interval of the reception antennas 12.

Also, the phase of a reception wave can be obtained by the DBF process that implements a concept of phased array antennas in a digital process. In a phased array antennas, a phase shifter to shift the phase of a radio wave is disposed at the following stage of each of the reception antennas 12, to control the shift amount of each of the reception antennas 12 depending on the angle to a target. For example, in the example in FIG. 8(b), by advancing the phase of the radio wave received by the reception antenna 12 on the left side by $\phi$, it can be shifted to the same phase as the phase of the radio wave received by the reception antenna 12 on the right side. Namely, the directivity is oriented in the direction $\theta$. By monitoring the sum of signal strengths of the reception antennas 12 while changing the shift amounts to change the orienting direction, the angle $\theta$ of the target can be identified because the signal strengths take maximal values when the shift amounts are matched with the angle $\theta$ of the target.

The DBF process realizes this process by a digital circuit such as a DSP. The DBF process samples a reception signal at a frequency sufficiently greater than a beat frequency for one or more cycles. The beat frequency is a frequency generated by a slight difference between frequencies of a transmission wave in a millimeter wave band and a reception wave. Therefore, the frequency of the beat frequency is lower than that of the millimeter wave in an order of magnitude. If the frequency of the millimeter wave is several dozen GHz, the frequency of the beat frequency is less than several hundred kHz.

Figure 9:
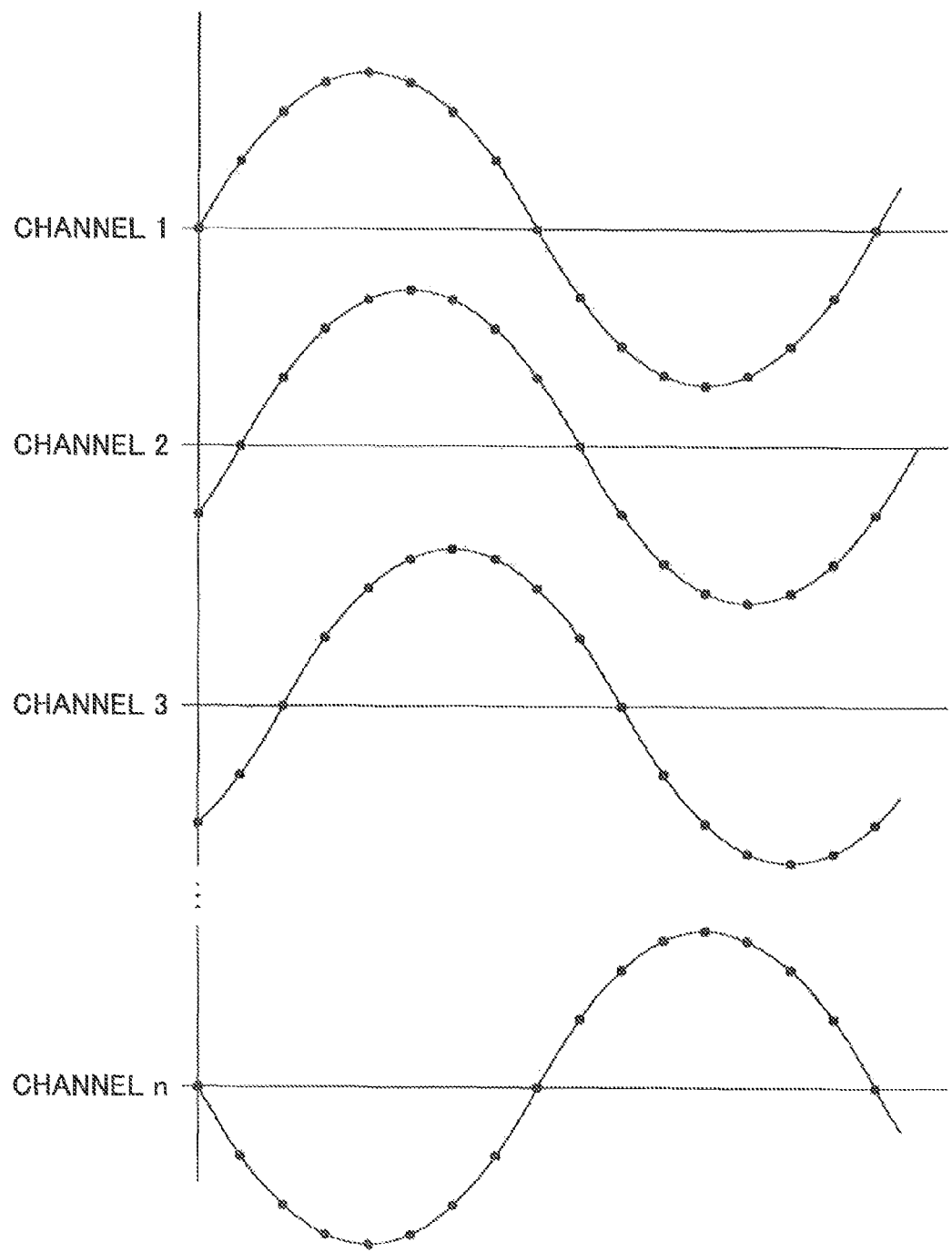
FIG. 9 is an example of a conceptual diagram illustrating sampling.

FIG. 9 is an example of a conceptual diagram illustrating sampling. Depending on angles to a target, phase differences are generated in channels 1 to n. By sampling data of beat signals for one or more cycles, the phases received by the respective reception antennas 1 to n can be recorded in reception buffers. In the figure, a black-circled point is a sampling point. In the DS process, once a beat signal is taken in, it can be used to form a beam in an arbitrary direction to detect a target. Namely, by changing $\theta$ with a predetermined resolution (for example, 0.5°), it controls data to be read out from the reception buffer to be added. Similarly to phased array antennas, the added result of the data should be a maximal at an angle corresponding to the direction where the target exists. Therefore, depending on the beam forming direction, data read out from the reception buffer is changed, the added value at that moment is recorded, and when the added value is the maximal, it can be estimated that the target exists at the angle. In this way, in the DBF process, once data of the beat signals of all reception antennas 12 is taken in, beams can be formed in arbitrary directions. Therefore, it is possible to identify directions of multiple targets within an irradiation range of a transmission wave at once.

The added results (power) with respect to the angle θ are plotted as illustrated in FIG. 3(*b*). In FIG. 3(*b*), the added results are illustrated as power. FIG. 3(*b*) is for a case of only one target, and there is one outstanding peak. Other peaks correspond to side lobes. By searching for peaks greater than or equal to a threshold, the angle to the target can be identified (3° rightward relative to the front direction in the figure).

If multiple targets exist, multiple peaks are obtained for angles, with which it can be estimated that the targets exist at the angles, respectively.

Note that, other than the DBF process, various methods are available for obtaining the angle such as MUSIC analysis or CAPON analysis. The MUSIC analysis is a method that forms a matrix having analysis results of beat signals arrayed, and uses an eigenvalue correlation. It will be briefly described. From results of the Fourier transform applied to a rise interval and a fall interval, respectively, the amplitudes and phases of the reception antennas 12 at a peak frequency of the power are arrayed to generate vectors. Then, an autocorrelation matrix is obtained from these vectors, and eigenvalues of the autocorrelation matrix are obtained. It is considered that the number of eigenvalues correlates to the number of independent reception waves. From the eigenvalues and steering vectors of the angle θ, a MUSIC spectrum can be obtained.

Also, a mono-pulse method may be adopted for angle calculation. The mono-pulse method is a method that calculates sums, differences, power ratios, and phase differences of reception signals received by reception antennas based on an antenna pattern, and detects the directional angle of a target from the calculation results.

Referring to FIG. 6 again, the angle verification unit 24 verifies whether the angle to the target detected by the angle detection unit 23 is correct (whether there exist reception waves that are not separated). The angle of a target detected by the angle detection unit 23 is referred to as a "measured angle". The angle verification unit 24 stores the estimated amplitude and phase calculation formula beforehand. The estimated amplitude and phase calculation formula is a formula to calculate an amplitude and a phase of a reception wave estimated for each channel from a measured angle, which will be described in detail below.

[Angle Detection in the Present Embodiment]

As above, although the radar apparatus 100 can detect the measured angle of a target, there are cases where it is difficult to separate and detect a target when multiple targets exist in a narrow range as represented by a mirror ghost described above.

Figure 10:
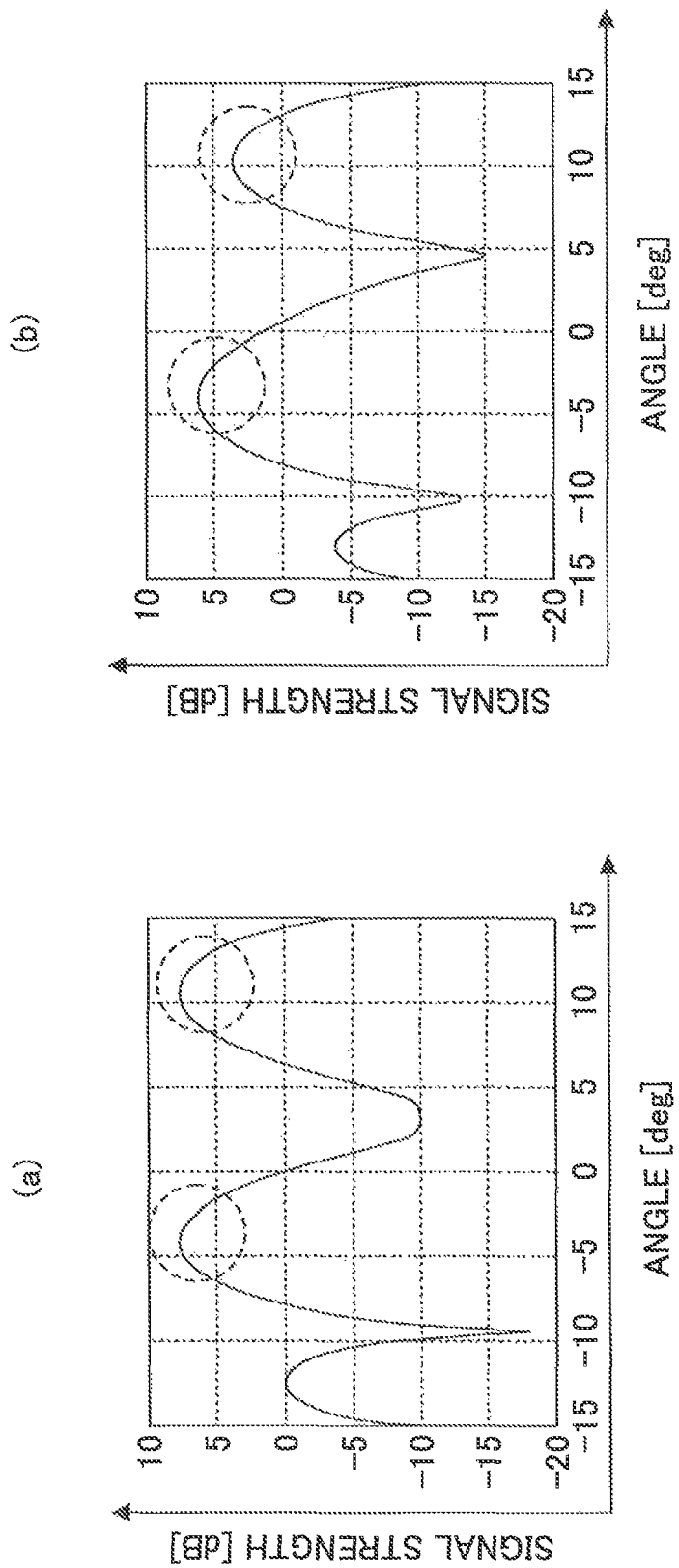
FIG. 10 is an example of diagrams illustrating where identification of the directions of targets is difficult.

FIG. 10 is an example of diagrams illustrating where identification of the directions of targets is difficult. FIG. 10(*a*) illustrates a calculation result of angles detected by the angle detection unit 23 when two targets actually exist. There are two peaks of the signal strength greater than or equal to a threshold (for example, 0 dB), and the angles are about −3.5° and +10°, respectively. These angles are substantially the same as the directions in which the targets actually exist. This is an example where an angle calculation is appropriately performed.

FIG. 10(*b*) illustrates a calculation result of angles detected when three targets actually exist. Three targets exist at angles of −5°, −2°, and +10°, respectively. However, comparing FIG. 10(*b*) with FIG. 10(*a*), it can be understood that results of the angle calculations look alike. Namely, both FIGS. 10(*a*) and (*b*) have peaks at +10°, and hence, the targets at +0.10° are detected. However, a peak appears around −3.5° in FIG. 10(*b*), similarly to FIG. 10(*a*). This happens because the radar apparatus 100 cannot separate a radio wave coming in −5° from a radio wave coming in −2°, based on the calculation result of angles in FIG. 10(*b*).

It has been known that such a state, in which two radio waves having little difference in angles reach the radar apparatus 100, may be generated in a tunnel or the like when a radio wave is reflected by a preceding vehicle, and the radio wave reflected by the preceding vehicle is reflected again by a tunnel wall. The mirror ghost is a target that appears as if existing in an extended direction of a reception wave received after being reflected by the tunnel wall after having been reflected by the preceding vehicle.

If a radio wave coming from a mirror ghost cannot be separated from another radio wave coming from a preceding vehicle, the angle (lateral position) of the preceding vehicle that has been captured by the radar apparatus 100 is changed to an intermediate position between the preceding vehicle and the mirror ghost, for example, soon after entering into a tunnel. In this case, from the vehicle's viewpoint, the preceding vehicle is recognized as if it moves sideways (for example, moves closer to an adjacent lane for a lane change)

If only one angle is obtained although multiple targets exist, and arriving directions of reflected waves are different, the radar apparatus 100 in the present embodiment detects that the arrived waves are not separated, by using data of the amplitudes and phases of the waves received by the reception antennas 12. In the present embodiment, attention is paid to the fact that the amplitude and phase data used for obtaining an angle is not the same for a single-target case and for a multiple-target case even if calculation results of angles are the same, such as targets at the angle of −3.5° in FIGS. 10(*a*) and (*b*). By using this knowledge, it is possible detect that an angle obtained from a reception wave is different from a direction in which a target actually exists.

[Differences of Amplitudes and Phases Generated by the Number of Targets and Angles]

Figure 11:
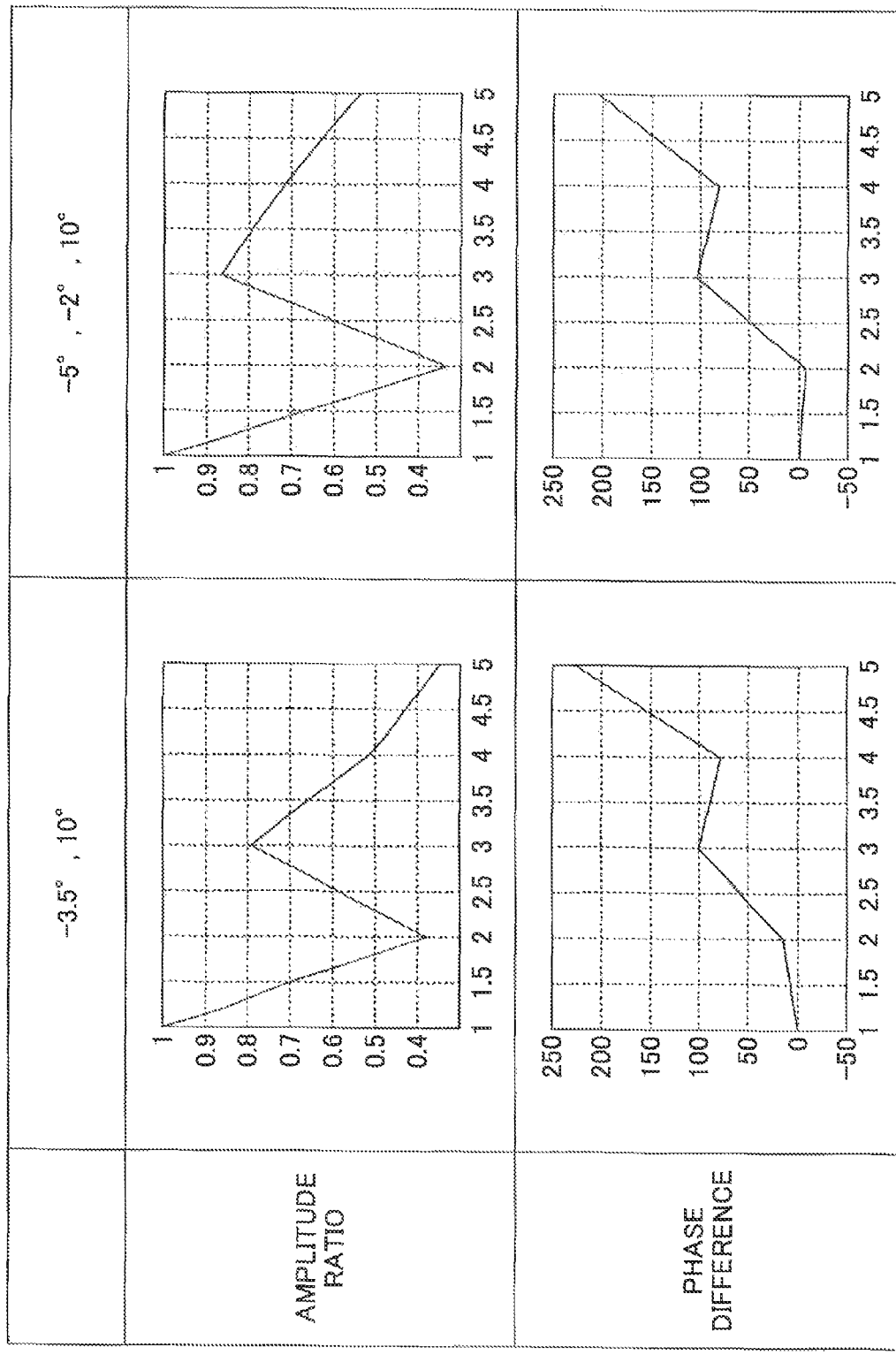
FIG. 11 is an example of diagrams illustrating comparison between amplitudes or phases for each reception antenna when targets are positioned at angles of about −3.5° and +10°, or −5°-2°, and 10°.

FIG. 11 is an example of diagrams illustrating comparison between the amplitudes or the phases of the reception antennas when targets are positioned at the angles of about −3.5° and +10°, and at the angles of −5°, −2°, and 10°. The horizontal axes in FIG. 11 represent channel numbers (reception antennas). The vertical axes in the upper row represent the amplitude ratios of the amplitude of the channel number 1 to the amplitudes of the other channels, and the vertical axes in the lower row represent the phase differences of the phase of the channel number 1 to the phases of the other channels. Therefore, in both the separable state and the hardly-separable state, the amplitude ratio of the channel 1 is "1", and the phase difference of the channel 1 is "0".

The separable state and the hardly-separable state are compared in terms of the amplitude ratios.

Channel 3: separable state=0.78, hardly-separable state=0.86

Channel 4: separable state=0.50, hardly-separable state=0.72

Channel 5: separable state=0.35, hardly-separable state=0.55

The separable state and the hardly-separable state are compared in terms of the phase differences.
Channel 2: separable state=20, hardly-separable state=−8
Channel 5: separable state=230, hardly-separable state=200

Comparing the amplitude ratios or the phase differences for the channels in this way, it can be understood that there is a significant difference between the separable state and the hardly-separable state. Even if the calculation results indicate that the targets exist at the same angle, such as −3.5° as described with FIGS. 10(a)-(b), the amplitudes and phases of the channels are not the same, with which it can be estimated that it is the hardly-separable state from the comparison results of the amplitudes and phases.

Therefore, when it has been known that targets exist at an angle as the angle detection unit 23 has detected the angle, it can be determined whether the targets are separated or not, by obtaining the amplitudes and phases indicated by the channels, and comparing the amplitudes or phases of the channels. Namely, when a calculation result is obtained indicating that targets exist at about −3.5° and +10° as in the above example, it can be determined whether the calculation result of about −3.5° and +10° is correct or not, by obtaining and comparing the amplitudes and phases indicated by the channels, assuming that the targets exist at about −3.5° and +10°.

Namely, if the amplitudes and phases of the channels are equivalent, it turns out that the targets exist at about −3.5° and +10°, or if the amplitudes and phases of the channels are not equivalent, it turns out that there is an unseparated radio wave although the targets seem to exist at about −3.5° and +10°.

Note that although it is described using an example where the angle detection unit 23 detects angles by the DBF process, a result in that targets cannot be separated is not generated only due to a low resolution of angles by the angle detection unit 23. Namely, even if adopting a high-resolution angle estimation method such as the MUSIC analysis and the CAPON analysis, similar inconvenience may occur. The MUSIC analysis or the CAPON analysis has an upper limit of the number of arrived waves to be detected in one angle resolution. Therefore, it may allocate the same angle to radio waves coming in close directions. Consequently, even if an angle is obtained by such a method having a high angle resolution, similar inconvenience may occur.

[Amplitudes and Phases Obtained by Channels]

Figure 12:
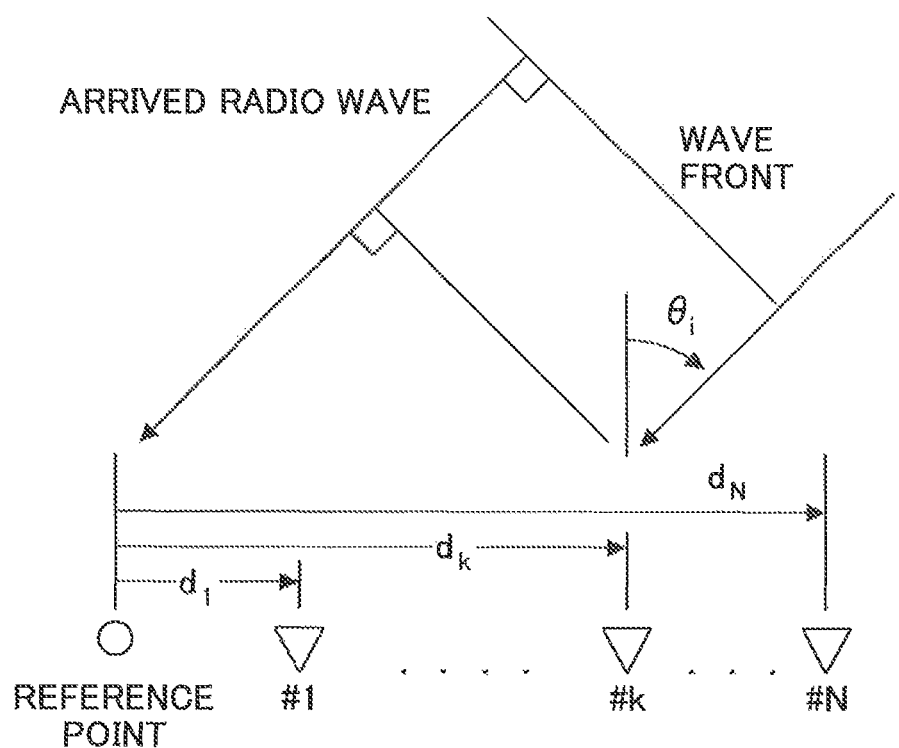
FIG. 12 is an example of a diagram illustrating a radio wave received by a reception antenna.

A method of obtaining amplitudes and phases at channels will be described. A signal generated by radio waves received by the reception antennas 12 can be represented as follows. FIG. 12 is an example of a diagram illustrating radio waves received by the reception antennas 12. Also, Formula (1) is a theoretical formula for signals when receiving two waves that arrived from places having virtually the same distance.

$$(CH\_1) = F_1 \exp\left[-j\frac{2\pi}{\lambda}d_1\sin\theta_1\right] + F_2\exp\left[-j\left(\frac{2\pi}{\lambda}d_1\sin\theta_2 + \phi\right)\right] \quad (1)$$

$$(CH\_2) = F_1 \exp\left[-j\frac{2\pi}{\lambda}d_2\sin\theta_1\right] + F_2\exp\left[-j\left(\frac{2\pi}{\lambda}d_2\sin\theta_2 + \phi\right)\right]$$

$$\vdots$$

$$(CH\_N) = F_1 \exp\left[-j\frac{2\pi}{\lambda}d_N\sin\theta_1\right] + F_2\exp\left[-j\left(\frac{2\pi}{\lambda}d_N\sin\theta_2 + \phi\right)\right]$$

$F_i$: the amplitude of the arrived wave
$d_n$: the distance from the reference point to the antenna
$\theta_i$: the angle to the arrived wave
$\phi$: the phase difference at the reference point
$\lambda$: the wavelength of the arrived wave A reference point is an arbitrary place on the same axis on which the reception antennas 12 are disposed, which is set to, for example, the position of the channel 1 of the reception antennas 12.

Formula (1) means that the signals received by the reception antennas 12 can be represented by superposing signals having a phase difference $\phi$ between channels generated by angles $\theta_i$, and phase differences due to slight distance differences that cannot be separated by the radar apparatus 100. What need to obtained here are the amplitude, or the magnitude, of the signal, and the phase difference $\phi$.

From a calculation result of angles for example, two angles are obtained, and in a case where the angles are −3.5° and 10°, they determine $\theta_1$ and $\theta_2$ in the above formula. The wavelength $\lambda$ and the distance $d_n$ from the reference point are known. However, the above formula includes the amplitude $F_i$ and the phase difference $\phi$ due to slight unseparable distance differences. Therefore, signals of the channels cannot not determined only by the above formula in theory.

In the following, a method of obtaining the amplitudes $F_i$ and the phase difference $\phi$ will be described. First, the theoretical formula for the reception antennas 12 is rewritten as follows.

$$x_\mu = \sum_i F_i \exp\left[-j\frac{2\pi}{\lambda}d_\mu \sin\theta_i\right] \equiv \sum_i F_i a_\mu(\theta_i) \quad (2)$$

$\mu$ is a reception antenna number, and i is a subscript representing a target. Comparing it with Formula (1), a term including the phase difference c is deleted. The phase difference $\phi$ in Formula (1) is rewritten to be included in F that is represented by a complex number (if a phase difference exists at reference point).

Suppose that $X_\mu$ represents a signal actually received by the reception antenna 12. A condition that makes $X_\mu$ equivalent to $x_\mu$ is as follows where $x_\mu$ is a value obtained by substituting parameters into Formula (1) assuming that the parameters have been obtained, and $\epsilon$ is infinitesimal.

$$|X_i - x_i|^2 < \epsilon \quad (3)$$

By substituting $x_\mu$ in Formula (3) with the right-hand side of Formula (2), and by simplification, Formula (4) is obtained. An * means a conjugate complex number. A subscript v represents a reception antenna number to distinguish it from $\mu$.

$$(LHS) = \sum_{\mu,i,j} \lfloor X_\mu X_\mu - X_\mu^* F_i a_\mu(\theta_i) - \quad (4)$$

$$F_i^* a_\mu^*(\theta_i) X_\mu + F_i^* a_\mu^*(\theta_i) X_\mu + F_i^* a_\mu^*(\theta_i) F_j a_\mu(\theta_j) \rfloor$$

Therefore, to make Formula (3) take a sufficiently small value, a condition that makes Formula (4) take a minimum value is as follows.

$$\begin{cases} \sum_{\mu,i} \lfloor -X_\mu^* a_\mu(\theta_j) + F_i^* a_\mu^*(\theta_i) a_\mu(\theta_j) \rfloor = 0 \\ \sum_{i} \lfloor -X_\mu^* F_j + F_i^* a_\mu^*(\theta_i) F_j \rfloor = 0 \\ \sum_{\mu,i} \lfloor -X_\mu a_\mu^*(\theta_j) + F_j^* a_\mu^*(\theta_i) a_\mu(\theta_j) \rfloor = 0 \\ \sum_{i} \lfloor -X_\mu F_j + F_j^* a_\mu(\theta_i) F_i \rfloor = 0 \end{cases} \quad (5)$$

Paying attention to the third formula in Formulas (5), the following relationship is obtained.

$$F_i = \sum_{\mu,\nu,j} (a_\mu^*(\theta_i) a_\mu(\theta_j))^{-i} a_\nu^*(\theta_j) X_\nu \quad (6)$$

Formula (6) means that the amplitudes Fi of arrived waves from targets can be obtained from the signals $X_\nu$ received by the reception antennas 12 and the measured angles $\theta_i$ of the targets. $X_\nu$ are complex numbers, and hence, the amplitudes $F_i$ are complex numbers as described above. The amplitude of a complex number (Z=a+ib) is $\sqrt{(a^2+b^2)}$, and the phase is arctan(b/a). Therefore, the amplitudes and the phases at the reference point of the arrived waves coming from the targets can be calculated. Namely, by using Formula (6), the amplitudes $F_i$ and the phase differences φ at the reference point can be obtained by only using the measured angles $\theta_i$ of the targets as parameters.

The amplitudes and phases obtained by Formula (6) correspond to "the amplitudes and phases indicated by the channels, assuming that the targets exist in the directions" as described with FIG. 11. Therefore, Formula (6) corresponds to the estimated amplitude and phase calculation formula.

[Angle Verification]

Accordingly, the angle verification unit 24 verifies measured angles θ detected by the angle detection unit 23 as follows.
(i) Obtain measured angles from the angle detection unit 23.
(ii) Calculate the amplitude and phase for each of the channels from the measured angles of the targets using Formula (6).
(iii) Compare the amplitudes of the channels calculated by the FFT unit 22 with the amplitudes calculated in (ii).
Compare the phases of the channels calculated by the FFT unit 22 with the phases calculated in (ii).
(iv) If the comparison result shows significant differences for at least one of the amplitudes and phases, it determines that unseparable radio waves exist, and no targets exist in the direction of the measured angles. If there are no significant differences, it determines that targets exist in the directions of the measured angles.

[Operational Steps]

Figure 13:
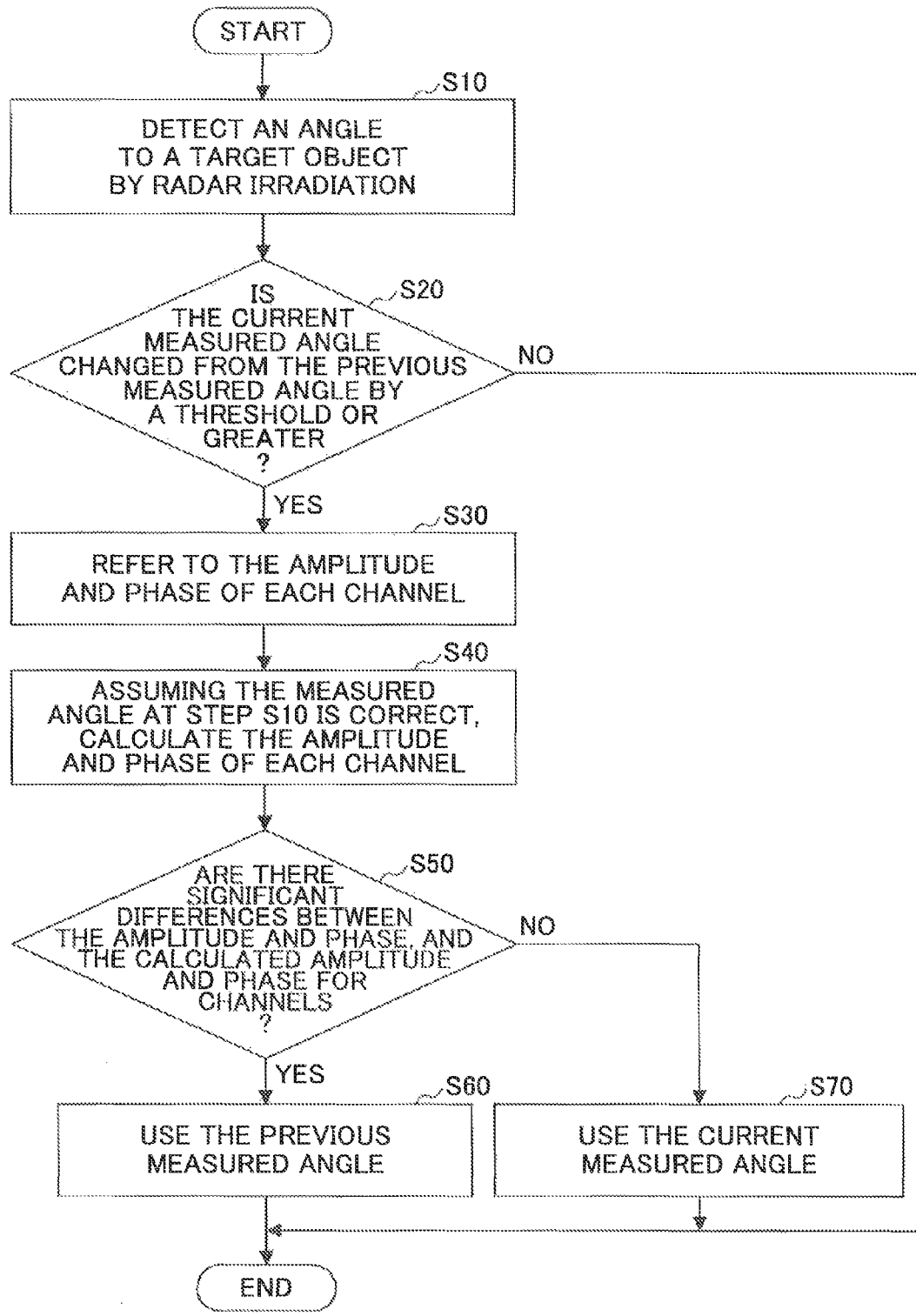
FIG. 13 is an example of a flowchart illustrating operational steps of a signal analysis unit.

FIG. 13 is an example of a flowchart illustrating operational steps of the signal analysis unit 16. The steps in FIG. 13 are repeatedly executed every time the radar apparatus 100 transmits a radio wave in a rise interval and a fall interval, and the reception antennas 12 receive the radio waves in the rise interval and the fall interval.

The FFT unit 22 of the radar apparatus 100 calculates the amplitudes and phases by Fourier transform, and the angle detection unit 23 detects measured angles of targets (Step S10).

The angle detection unit 23 determines whether a current measured angle changed from a previous measured angle by a threshold or greater (Step 320). This determination is executed for detecting whether a preceding vehicle goes into, for example, a tunnel to be in a state where radio waves cannot be separated. This makes it possible to reduce a process load because the measured angles are only verified in a state where radio waves cannot be separated. Verification of the measured angle may be executed only when the determination result is YES, or verification of the measured angle may be always executed without executing the determination.

Note that the measured angle to be determined is the measured angle of a target having the same frequency at the calculation point of the Fourier transform. This is because the lateral position is monitored for the same target.

If a current measured angle changed from a previous measured angle by the threshold or greater (YES at Step S20), the angle verification unit 24 refers to the amplitude and phase of each channel (Step S30). The amplitude and phase of each of the channels has been obtained by the Fourier transform.

Next, the angle verification unit 24 calculates the amplitude and phase of each channel from the estimated amplitude and phase calculation formula assuming that the measured angle at Step S10 is correct (Step S40).

The angle verification unit 24 compares the amplitude and phase with the calculated amplitude and phase for each of the channels, and determines whether there is a significant difference (Step S50). Note that the amplitudes and phases may not be compared as they are. Instead, from the amplitudes and phases at Step S30, for example, the amplitude ratios and phase differences between the channel 1 and the channels 2 to n are obtained, then, from the amplitudes and phases at Step S40, for example, the amplitude ratios and phase differences between the channel 1 and the channels 2 to n are obtained, to compare the amplitude ratios with each other, and the phase differences with each other for the channels. Comparing in this way, correct comparison can be made when the amplitudes and phases at Step S30 or S40 are shifted as a whole to be different.

If there is a significant difference (YES at Step S50), the signal analysis unit 16 adopts the previously measured angle as the lateral position of the target (Step S60). Namely, it determines that the number of arrived waves increases due to a multipath or the like, and the radio waves cannot be separated (or an upper limit of the number of detectable targets in a bin is exceeded when adopting a high-resolution angle calculation method such as the MUSIC analysis). Therefore, the lateral position of the target remains the same as, for example, the lateral position just before entering into a tunnel, which can prevent detecting the lateral position of the target in a shifted state.

Note that if it is estimated that the upper limit of the number of detectable targets in a bin is exceeded when adopting the MUSIC analysis, angle detection may be executed by a maximum likelihood method.

Also, the current measured angle may not be simply discarded, but may be used when a measured angle at the next time further changes from the current measured angle, to make the result further move sideways. This is to deal with a case where a preceding vehicle actually makes a lane change.

If there is no significant difference (NO at Step S50), the signal analysis unit 16 adopts the current measured angle as the lateral position of the target (Step S70).

Note that, at Step S40, instead of calculating using the estimated amplitude and phase calculation formula, expected amplitudes and phases for a measured angle may be obtained beforehand by the estimated amplitude and phase calculation formula, and implemented as a map. If the resolution of the measured angle is about 0.5°, it is practical because the size of the map does not get too great.

As described above, the radar apparatus in the present embodiment can detect that the angle (lateral position) is shifted if a preceding vehicle and a mirror ghost are not separated when the angle is detected by a low-resolution method such as a mono-pulse or the DBF process. Also, when adopting a high-resolution angle estimation method such as the MUSIC analysis and the CAPON analysis, it can detect that the angle (lateral position) is shifted if an upper limit of the number of detectable targets in a bin is exceeded. Thus, it can detect that the angle (lateral position) is shifted regardless of angle calculation methods.

Also, although detection of the angle of a target and a shift of the angle are described with embodiments, the present invention is not limited to the above embodiments, but various modifications and improvements can be made within the scope of the present invention.

The invention claimed is:

1. A radar apparatus configured to receive a transmission wave reflected by a target object by two or more antennas, comprising:
   a signal analysis unit configured to analyze reception waves received by the respective two or more antennas, and to obtain an amplitude and a phase of each of the reception waves received at the respective antennas, the amplitude and the phase being obtained at a frequency with which a reception strength shows a peak;
   a direction detection unit configured to detect a direction of the target object based on the phases of the reception waves received by the respective antennas;
   an estimated amplitude and phase output unit configured to output an estimated amplitude and an estimated phase of each of reception waves to be received by the respective antennas, assuming that the target object exists in the direction detected by the direction detection unit; and
   a comparison unit configured to compare amplitudes and phases for each of the antennas such that an amplitude obtained by the signal analysis unit is compared with an amplitude output by the estimated amplitude and phase output unit, and a phase obtained by the signal analysis unit is compared with a phase output by the estimated amplitude and phase output unit,
   wherein the comparison unit is also configured to determine, when the comparison shows a difference of greater than a predetermined threshold in at least one of the amplitudes that are compared and the phases that are compared, or in at least one of amplitude ratios between the amplitudes that are compared and phase differences between the phases that are compared, that two or more of the reception waves originate in the same orientation.

2. The radar apparatus as claimed in claim 1, wherein the comparison unit compares at least one of the amplitude ratios and the phase differences for each of the antennas such that an amplitude ratio of an amplitude of a predetermined one of the antennas to an amplitude of another one of the antennas, obtained by the signal analysis unit, is compared with another amplitude ratio of an amplitude of the predetermined one of the antennas to an amplitude of the other one of the antennas, output by the estimated amplitude and phase output unit, and
   the phase difference between a phase of the predetermined one of the antennas and a phase of the other one of the antennas, obtained by the signal analysis unit, is compared with another phase difference between a phase of the predetermined one of the antennas and a phase of the other one of the antennas, output by the estimated amplitude and phase output unit.

3. The radar apparatus as claimed in claim 2, wherein when the direction detected by the direction detection unit is changed by a threshold or greater relative to the direction detected by the direction detection unit for a previous time, the comparison unit compares the amplitudes or the phases, or the amplitude ratios or the phase differences.

4. The radar apparatus as claimed in claim 2, wherein when the comparison unit determines that the comparison shows the difference of greater than the predetermined threshold in at least one of the amplitudes and the phases, or in at least one of the amplitude ratios and the phase differences, the direction detection unit outputs the direction of the target object detected by the direction detection unit for a previous time.

5. An angle verification method for a radar apparatus configured to receive a transmission wave reflected by a target object by two or more antennas, the method comprising:
   a signal analysis step of analyzing reception waves received by the respective two or more antennas, and to obtain an amplitude and a phase of each of the reception waves received at the respective antennas, the amplitude and the phase being obtained at a frequency with which a reception strength shows a peak;
   a direction detection step of detecting a direction of the target object based on the phases of the reception waves received by the respective antennas;
   an estimated amplitude and phase output step of outputting an estimated amplitude and an estimated phase of each of reception waves to be received by the respective antennas, assuming that the target object exists in the direction detected by the direction detection unit; and
   a comparison step of comparing amplitudes and phases for each of the antennas such that an amplitude obtained by the signal analysis step is compared with an amplitude output by the estimated amplitude and phase output step, and a phase obtained by the signal analysis step is compared with a phase output by the estimated amplitude and phase output step, and
   a determining step of determining, when the comparison step shows a difference of greater than a predetermined threshold in at least one of the amplitudes that are compared and the phases that are compared, or in at least one of amplitude ratios between the amplitudes that are compared and phase differences between the phases that are compared, that two or more of the reception waves originate in the same orientation.

* * * * *